United States Patent [19]

Nakazato et al.

[11] Patent Number: 5,102,930
[45] Date of Patent: Apr. 7, 1992

[54] SILICONE-BASED FABRIC FINISHING AGENT AND FABRIC MATERIAL FINISHED THEREWITH

[75] Inventors: Morizo Nakazato; Toshio Ohba; Masaki Tanaka; Hideki Hagiwara, all of Gunma, Japan

[73] Assignee: Shin-Etsu Chemical Company, Limited, Japan

[21] Appl. No.: 381,336

[22] Filed: Jul. 18, 1989

[30] Foreign Application Priority Data

Jul. 19, 1988 [JP] Japan ................................ 63-179919

[51] Int. Cl.$^5$ ........................... C08K 5/15; C08L 83/02
[52] U.S. Cl. .................................... 524/114; 524/109; 524/188; 524/859
[58] Field of Search ................ 524/109, 114, 188, 859

[56] References Cited

U.S. PATENT DOCUMENTS 4,496,687 1/1985 Okada et al. ...................... 524/745
4,725,635 2/1988 Okada et al. ...................... 524/114

Primary Examiner—Paul R. Michl
Assistant Examiner—Tong S. Lee
Attorney, Agent, or Firm—Millen, White and Zelano

[57] ABSTRACT

A novel silicone-based fabric finishing agent is proposed which is particularly suitable for finishing a fabric material containing keratinous fibers, e.g., wool, for imparting the fabric material with excellent shrinkproofness and soft and pleasant feeling of touch even after repeated laundering treatments. The fabric finishing agent is an aqueous emulsion of a hydroxy-containing organopolysiloxane with admixture of a mixture of colloidal silica and a reaction product of an amino-functional alkoxy silane or a hydrolysis product thereof with an acid anhydride, an epoxy-functional alkoxy silane compound and a curing catalyst.

18 Claims, No Drawings

SILICONE-BASED FABRIC FINISHING AGENT AND FABRIC MATERIAL FINISHED THEREWITH

BACKGROUND OF THE INVENTION

The present invention relates to a novel silicone-based fabric finishing agent and a fabric material finished therewith. More particularly, the invention relates to a silicone-based fabric finishing agent particularly suitable for finishing a fabric material containing keratinous fibers such as wool to impart the treated fabric material with excellent shrink-proofness and softness capable of withstanding laundering as well as a keratinous fiber-containing fabric material finished therewith.

As is well known, fabric materials made of keratinous fibers such as, typically, wool in general have a problem that undesirable phenomena of shrinkage and felting take place in the fabric material when it is laundered in an aqueous washing bath. Various kinds of fabric finishing agents have been proposed and practically used with an object to prevent or reduce such undesirable phenomena of shrinkage and felting by laundering, of which silicone-based ones are most widely used in the fabric industry. For example, Japanese Patent Publication 48-33435 discloses a silicone-based fabric finishing agent which is a solution of a linear-chain dimethylpolysiloxane having a viscosity of at least 50 centistokes at 25° C. and terminated at each molecular chain end with a silanolic hydroxy group and a methyl hydrogen polysiloxane in an organic solvent with admixture of a catalyst. Japanese Patent Publication 48-38036 teaches a fabric-finishing method by using a solution of a high-polymeric organopolysiloxane and a catalyst in a chlorinated hydrocarbon solvent. Japanese Patent Publication 53-28468 teaches a fabric-finishing agent comprising diorganopolysiloxanes having amino groups and alkoxy groups as the principal ingredients. Japanese Patent Publication 58-4114 teaches a fabric-finishing agent comprising organopolysiloxanes having mercapto groups and amino groups as the principal ingredients.

Although these silicone-based fabric-finishing agents of the prior art are to some extent effective to prevent shrinkage of keratinous fiber-made fabric materials by laundering but the shrink-proofness obtained thereby is still insufficient. In addition, another disadvantage is unavoidable in the fabric material finished with such a fabric finishing agent that the feeling of touch of the fabric material is badly affected to decrease the commercial value of the finished fabric material.

SUMMARY OF THE INVENTION

The present invention accordingly has an object to provide a novel and improved silicone-based fabric finishing agent capable of imparting excellent shrink-proofness and softness with durability to the fabric material or, in particular, to a keratinous fiber-containing fabric material finished therewith without disadvantageous influences on the quality of the fabric material as finished.

Thus, the silicone-based fabric finishing agent of the present invention comprises, in the form of a uniform blend:

(A) an aqueous emulsion of (A-1) 100 parts by weight of an organopolysiloxane having, in a molecule, at least two hydroxy groups directly bonded to the silicon atoms emulsified in (A-2) from 25 to 600 parts by weight of water containing (A-3) from 0.3 to 20 parts by weight of an anionic surface active agent dissolved in the water;

(B) from 1 to 60 parts by weight of a uniform blend consisting of (B-1) from 0.1 to 10 parts by weight of a reaction product of an amino-functional alkoxy silane compound or a hydrolysis product thereof with an acid anhydride and (B-2) from 1 to 50 parts by weight of a colloidal silica;

(C) from 0.1 to 10 parts by weight of an epoxy-functional alkoxy silane compound; and (D) from 0.01 to 10 parts by weight of a curing catalyst.

The finished fabric material of the invention is obtained by soaking a keratinous fiber-made fabric material with the above defined silicone-based fabric finishing agent in the form of an aqueous emulsion followed by drying and heat-treatment of the thus soaked fabric material.

DETAILED DESCRIPTION OF THE PREFERRED EMBODIMENTS

As is described above, the base constituent of the inventive fabric-finishing agent is the component (A) which is an aqueous emulsion of (A-1) a specific organopolysiloxane emulsified in (A-2) water containing (A-3) an anionic surface active agent dissolved therein.

The organopolysiloxane as the component (A-1) necessarily has at least two silicon-bonded hydroxy groups in a molecule. The organic groups bonded to the silicon atoms are not particularly limitative including alkyl, alkenyl and aryl groups but it is preferable that substantially all of the organic groups bonded to the silicon atoms are methyl groups. The molecular structure and degree of polymerization of the organopolysiloxane are also not particularly limitative but, preferably, the organopolysiloxane has an average molecular weight of at least 10,000. The hydroxy groups can be bonded to the silicon atoms at any positions in the molecular structure.

Such a hydroxy-containing organopolysiloxane compound is well known in the art of silicones and can be prepared according to a known procedure. Applicable methods include, for example, a method by the ring-opening polymerization reaction of an oligomeric cyclic organopolysiloxane such as octamethyl cyclotetrasiloxane, a method of (co)hydrolysis of a straightly linear or branched linear organopolysiloxane having silicon-bonded hydrolyzable groups such as alkoxy and acyloxy groups and a method of (co)hydrolysis of an organochlorosilane compound or a mixture of two kinds or more of organo chlorosdilane compounds.

The above described organopolysiloxane as the component (A-1) is emulsified in water as the component (A-2) with the aid of an anionic surface active agent as the component (A-3) dissolved therein. Various types of anionic surface active agents are known in the art and satisfactorily used in the preparation of the aqueous emulsion as the component (A), of which those conventionally used as the dispersing aid in emulsion polymerization are preferred, including sulfonic acids, sulfate esters and phosphate esters as well as salts thereof. Particular examples of these classes of anionic surface active agents include salts of aliphatic sulfate esters such as sodium lauryl sulfate, aliphatic group-substituted benzene sulfonic acids such as dodecylbenzene sulfonic acid and aliphatic group-substituted naphthalene sulfonic acids, salts of polyethylene glycol sulfate esters, salts of lauryl sulfates and the like. It is optional that the above described anionic surface active agent is used in combination with a limited amount of a surface active agent of a different type such as non-ionic ones, e.g., polyoxyethylene alkyl ethers and polyoxyethylene alkylphenyl ethers.

Various methods are known and applicable to the emulsification of the organopolysiloxane as the component (A-1) in water containing the above described anionic surface active agent dissolved therein. For example, the organopolysiloxane is added to water containing the surface active agent and the mixture is vigorously agitated to effect direct emulsification of the organopolysiloxane in the aqueous medium. Alternatively, an oligomeric cyclic organopolysiloxane such as octamethyl cyclotetrasiloxane is emulsified in water containing the anionic surface active agent and then the emulsion is admixed with a known catalyst for the ring-opening polymerization of the cyclic organopolysiloxane followed by heating so that an aqueous emulsion of the hydroxy-containing organopolysiloxane is obtained by the in situ polymerization of the cyclic organopolysiloxane.

The amount of water, in which the organopolysiloxane is emulsified, is not limitative provided that a stable aqueous emulsion can be obtained but it is usually in the range from 25 to 600 parts by weight per 100 parts by weight of the organopolysiloxane. The amount of the anionic surface active agent as the emulsifying agent of the organopolysiloxane is usually in the range from 0.3 to 20 parts by weight or, preferably, from 0.5 to 5 parts by weight per 100 parts by weight of the organopolysiloxane. When the amount of the anionic surface active agent is too small, no stable aqueous emulsion can be obtained as a matter of course. When the amount of the anionic surface active agent is too large, on the other hand, a decrease is caused in the mechanical strength of the coating film on the fiber surface obtained by the finishing treatment of a fabric material with the silicone-based fabric finishing agent.

It is further optional that the aqueous emulsion of the organopolysiloxane is prepared by admixing the oligomeric cyclic organopolysiloxane with an organosilane compound having three hydrolyzable groups in a molecule such as those represented by the general formula RSi(OR')$_3$, in which R is a monovalent hydrocarbon group such as alkyl, alkenyl and aryl groups and R' is an alkyl or acyl group, or, alternatively, the aqueous emulsion is admixed with an aqueous emulsion of the above mentioned hydrolyzable organosilane compound.

The component (B) is a combination of two different materials (B-1) and (B-2) and serves to improve the adhesion of the cured film of the silicone to the surface of the fibers on which the inventive fabric finishing agent has been dried to form a cured coating film by heating.

The component (B-1) is a reaction product of an amino-functional alkoxy silane or a hydrolysis product thereof with an acid anhydride. The amino-functional alkoxy silane is represented by the general formula YR$^1_m$Si(OR$^2$)$_{3-m}$, in which Y is an amino-substituted alkyl group such as 2-aminoethyl, 3-aminopropyl and N-(2-aminoethyl)-3-aminopropyl groups, R$^1$ is a monovalent hydrocarbon group having 1 to 6 carbon atoms, R$^2$ is a lower alkyl group such as methyl, ethyl, propyl and butyl groups and the subscript m is zero, 1 or 2. Particular examples of the amino-functional alkoxy silane include 3-aminopropyl triethoxy silane, N-(2-aminoethyl)-3-aminopropyl methyl dimethoxy silane, 3-aminopropyl methyl diethoxy silane, N-(2-aminoethyl)-3-aminopropyl trimethoxy silane, N-triethylenediaminepropyl trimethoxy silane, N-triethylenediaminepropyl methyl dimethoxy silane and the like.

The acid anhydride to be reacted with the above described amino-functional alkoxy silane or a (partial) hydrolysis product thereof is exemplified by methyl tetrahydrophthalic anhydride, benzophenone tetracarboxylic acid anhydride, phthalic anhydride, maleic anhydride, pyromellitic anhydride, succinic anhydride, polyazelaic polyanhydride, trimellitic anhydride, phenyl maleic acid anhydride, methyl hexahydrophthalic anhydride, dodecyl succinic acid anhydride, dichloromaleic anhydride and the like.

The reaction between the amino-functional alkoxy silane and the acid anhydride proceeds exothermically by merely blending the two reactants at room temperature readily to give the desired reaction product as the component (B-1). The reaction proceeds between equimolar amounts of the amino groups in the amino-functional alkoxy silane or a hydrolysis product thereof and the acid anhydride so that the reaction mixture is usually formed from about equimolar amounts of the two reactants although it is optional to use either one of the reactants in an excessive amount.

The colloidal silica as the component (B-2), which is a part of the component (B), is not particularly limitative as to the type thereof provided that the silica particles have a particle diameter in the range from 10 to 40 nm stabilized, for example, with sodium ions or aluminum ions. Various kinds of commercial products in the form of an aqueous dispersion are available on the market and can be used as such including, for example, Snowtex 40 (a product by Nissan Chemical Co.) and the like.

The component (B) is preferably a combination of from 0.1 to 10 parts by weight of the reaction product of an amino-functional alkoxy silane or a hydrolysis product thereof with an acid anhydride as the component (B-1) and from 1 to 50 parts by weight of the colloidal silica, calculated as solid when it is an aqueous dispersion, as the component (B-2). More preferably, the component (B) is composed of 100 parts by weight of the component (B-2) calculated as solid and from 1 to 5 parts by weight of the component (B-1). When the amount of the component (B-1) is too small, the desired improvement is insufficient in the adhesion between the fiber surface and the coating film thereon formed from the fabric finishing agent along with a decreased degree in the enhancement thereby of the reinforcing effect of the colloidal silica on the organopolysiloxane in the component (A). When the amount of the component (B-1) is too large, on the other hand, a decrease is caused in the flowability of the fabric finishing composition. The component (B) can be prepared by the dropwise gradual addition of the component (B-1) to a specified amount of the colloidal silica as the component (B-2) under agitation.

The amount of the component (B) in the inventive silicone-based fabric finishing agent is in the range from 1 to 60 parts by weight or, preferably, from 2 to 30 parts by weight per 100 parts by weight of the organopolysiloxane as the component (A-1) forming the component (A). When the amount of the component (B) is too small, the mechanical strengths of the cured coating film on the fiber surface formed from the composition would be disadvantageously low. When the amount of the component (B) is too large, on the other hand, the cured coating film on the fiber surface formed from the composition would have an increased stiffness to affect the pleasant feeling of the fabric material finished with the agent.

The epoxy-functional alkoxy silane compound as the component (C) in the inventive fabric finishing agent serves to improve the adhesion between the surface of the fibers treated therewith and the cured elastomeric coating film formed on the fiber surface. The epoxy-functional alkoxy silane compound is represented by the general formula $ZR^3_n Si(OR^4)_{3-n}$, in which $R^3$ is a monovalent hydrocarbon group having 1 to 6 carbon atoms, $R^4$ is a lower alkyl group such as methyl, ethyl, propyl and butyl groups and Z is an epoxy-containing group such as, preferably, 3-glycidyloxypropyl group and 2-(3,4-epoxycyclohexyl)ethyl group. The subscript n is zero, 1 or 2 so that the silane compound has at least one alkoxy group bonded to the silicon atom in a molecule.

Particular examples of the epoxy-functional alkoxy silane compound usable in the invention include 3-glycidyloxypropyl trimethoxy silane, 3-glycidyloxypropyl methyl dimethoxy silane, 3-glycidyloxypropyl triethoxy silane, 3-glycidyloxypropyl methyl diethoxy silane, 2-(3,4-epoxycyclohexyl)ethyl trimethoxy silane, 2-(3,4-epoxycyclohexyl)ethyl methyl dimethoxy silane, 2-(3,4-epoxycyclohexyl)ethyl triethoxy silane and the like.

The amount of the epoxy-functional alkoxy silane compound as the component (C) in the inventive fabric finishing agent is in the range from 0.1 to 10 parts by weight or, preferably, from 0.5 to 5 parts by weight per 100 parts by weight of the organopolysiloxane as the component (A-1). When the amount thereof is too small, the desired effect is insufficient in the improvement of the adhesion between the fiber surface and the cured elastomeric film of the composition formed on the fiber surface. When the amount thereof is too large, on the other hand, the cured coating film on the fiber surface would have increased stiffness to badly affect the feeling of the finished fabric material.

The epoxy-functional alkoxy silane compound as the component (C) can be compounded in the inventive composition at any stage of the preparation. For example, the component (C) is mixed together with the components (B-1) and (B-2) to give a combination of the components (B) and (C) which is then blended with the component (A). Alternatively, the component (C) can be added to a mixture of the components (A) and (B) either before or after admixing of the component (D) described below.

The component (D) is a curing catalyst which serves to convert the coating film of the inventive composition on the fiber surface into a cured elastomeric film firmly adhering to the surface. Examples of suitable compounds as the curing catalyst include metal salts of an organic acid such as dibutyl tin dilaurate, dioctyl tin dilaurate, dibutyl tin diacetate, tin octoate, tin laurate, iron octoate, lead octoate and the like, titanate esters such as tetrabutyl titanate and the like, amine compounds such as n-hexyl amine, guanidine and derivatives thereof and the like, and so on though not particularly limitative thereto. It is preferable that the curing catalyst is added to the inventive fabric finishing agent in the form of an aqueous emulsion of the o/w type prepared beforehand by emulsification in water containing a surface active agent.

The amount of the curing catalyst as the component (D) in the inventive fabric finishing agent is in the range from 0.01 to 10 parts by weight or, preferably, from 0.1 to 3 parts by weight per 100 parts by weight of the organopolysiloxane as the component (A-1). When the amount thereof is too small, the coating film of the composition on the fiber surface cannot be completely cured. On the other hand, no further improvement can be obtained in the curing of the coating film of the composition on the fiber surface even by increasing the amount thereof over the above mentioned upper limit rather with some disadvantageous influences on the heat resistance of the cured coating film.

The inventive fabric finishing agent can be obtained by compounding the above described components in several different orders of mixing. It should be noted, however, that it is essential to mix the reaction product of the amino-functional alkoxy silane or a hydrolysis product thereof and the acid anhydride as the component (B-1) with the colloidal silica as the component (B-2) to give a uniform mixture as the component (B) beforehand. A preferable way of mixing is that the aqueous emulsion of the organopolysiloxane as the component (A) is first prepared and then admixed with the separately prepared component (B) followed by the addition of the component (D). No particularly powerful mixing or blending machine is required in the preparation and any known machines can be used satisfactorily. When the components (B-1) and (B-2) are compounded separately, for example, by adding the component (B-1) to a mixture prepared by blending the components (A), (B-2) and (D), a gelled material is formed in the mixture which can never be dispersed to give a uniform composition even by undertaking a most powerful blending means.

The inventive fabric finishing agent in the form of an aqueous emulsion prepared in the above described manner should have a pH in the range from 3 to 12 or, preferably, from 5 to 9, if necessary, by adding a small amount of an acid or alkali, e.g., sodium carbonate, as a pH controlling agent. When the pH of the composition is outside the above mentioned range, several problems are encountered in handling and practical use thereof. Most preferably, the pH is in the range from 6 to 9 in consideration of the safety problem on workers.

It is optional that the inventive silicone-based fabric finishing agent is admixed with various kinds of additives conventionally used, for example, in water-based coating compositions including thickening agents, defoaming agents, pigments, dyes, antiseptic agents, penetrants, e.g., ammonia water, antistatic agents, e.g., anionic and non-ionic surface active agents, and the like.

In the finishing treatment of a fabric material such as keratinous fiber-containing woven and knit cloths with the inventive fabric finishing agent, the fabric material is soaked with the finishing agent by padding or coating followed by drying and heat-treatment. The amount of the inventive fabric finishing agent deposited on the fiber surface is preferably in the range from 0.5 to 10% by weight calculated as solid based on the weight of the dry fabric material. When a padding method is followed, the pad bath is prepared by adjusting the solid content of the inventive fabric finishing agent in the range from 2 to 40% by weight and the web of the fabric material is dipped in the bath followed by centrifuging on a centrifugal separator or mangling on a mangle roller to adjust the deposited amount of the composition and the fabric material thus soaked with the composition is dried at a temperature of 100° to 120° C. for 30 seconds to 3 minutes by using an appropriate fabric-processing apparatus such as drying ovens and pin tenters followed by a heat treatment to cure the dried composition at a temperature in the range from 130° to 180° C. for 1 to 10 minutes or, preferably, at a temperature from 140° to 160° C. for 1 to 3 minutes. When a coating method is followed, it is preferable that the fabric finishing agent having the above mentioned solid content is admixed with a water-soluble polymeric thickening agent such as carboxymethyl cellulose, methyl cellulose, sodium salt of polyacrylic acid and the like to have an increased viscosity and a web of the fabric material is coated with the thus prepared coating liquid by using a roll coater, knife coater and the like followed by drying and heat treatment under substantially the same conditions and schedule as in the padding method.

The keratinous fiber mentioned here includes various kinds of animal hairs such as ordinary wool, lamb's wool, botany wool, mohair, cashmere, alpaca and the like. These fibrous materials are characterized by the scaly structure on the surface thereof. The above described inventive silicone-based fabric finishing agent gives quite satisfactory results of finishing not only to fabric materials made from these keratinous fibers alone as a matter of course but also to any mixed-spun or mixed-woven fabric materials containing a substantial proportion of the keratinous fibers. The form of the fabric materials to which the inventive fabric finishing agent is applicable includes yarns, woven cloths, non-woven fabrics and knit cloths as well as clothes made from such a cloth irrespective of the kind of the clothes.

When finished with the inventive silicone-based fabric finishing agent, the fabric materials can be imparted with excellent shrink-proofness and softness and also can be freed from the unpleasant phenomenon of pilling which takes place more or less when keratinous fiber-made fabric materials are rubbed with each other as in wearing of the clothes. Moreover, the improvement in these regards is durable and little decreased to withstand repeated laundering. No shrinkage or felting is caused by laundering in the fabric materials finished with the inventive fabric finishing agent so that the fabric material after laundering can retain the size and feeling of touch before laundering not only in laundering by a professional laundryman but also in laundering by using a household electric washing machine. Thus, the wooly fabric material finished with the inventive fabric finishing agent deserves the grade name of "washable wool". Needless to say, the inventive silicone-based fabric finishing agent is applicable to fabric materials of any kind of fibers other than keratinous ones including other natural and synthetic fibers to improve certain properties of the respective fibers. Moreover, the composition of the invention is useful as a hair-treatment agent for beauty purpose to decrease dry and loose feeling of the hair to provide protection or shape setting to the hair so that the inventive composition finds use in cosmetics.

In the following, the present invention is described in more detail by way of examples, in which the term of "parts" always refers to "parts by weight".

EXAMPLES AND COMPARATIVE EXAMPLES

An aqueous emulsion of an organopolysiloxane was prepared as described below to serve as the component (A). Thus, a base emulsion was prepared, by using a homomixer, from 500 parts of octamethyl cyclotetrasiloxane, 25 parts of methyl trimethoxy silane and 465 parts of water containing 10 parts of dodecylbenzene sulfonic acid and the base emulsion was passed twice through a homogenizer under a pressure of 3000 psi to give a stable aqueous emulsion, which was heated at 70° C. for 12 hours in a flask to effect the in situ polymerization of the organopolysiloxane. After cooling to room temperature and standing as such for 24 hours, the pH of the emulsion was adjusted to 7.0 by using sodium carbonate. This aqueous emulsion contained 47% by weight of non-volatile matters. The organopolysiloxane per se, which could be isolated from the emulsion by admixing the emulsion with methyl alcohol, exhibited a viscosity of 7200 centipoise at 25° C. in a 20% by weight solution in toluene.

Separately, 221 parts of 3-aminopropyl triethoxy silane were added dropwise to a mixture of 98 parts of maleic anhydride and 319 parts of ethyl alcohol under agitation to give a reaction product, which was slowly added dropwise to a colloidal silica (Snowtex 40, supra) containing 0.6% by weight of Na$_2$O and having a pH of 9.3, of which the solid content was 40% by weight, to give a uniform but slightly cloudy dispersion having a pH of 3.4 to serve as the component (B).

Further separately, 30 parts of dioctyl tin dilaurate were emulsified in 69 parts of water containing 1 part of polyoxyethylene nonylphenyl ether to give an aqueous emulsion, which is referred to as the emulsion D hereinbelow, to serve as the component (D).

Thereafter, a uniform silicone-based aqueous emulsion, referred to as the emulsion I hereinbelow, was prepared by admixing 100 parts of the component (A) in the form of an aqueous emulsion with 9 parts of the component (B) and 1.5 parts of the emulsion D followed by further admixture of 0.5 part of 3-glycidyloxypropyl trimethoxy silane as the component (C).

Another silicone-based aqueous emulsion, referred to as the emulsion II hereinbelow, was prepared for comparative purpose in substantially the same formulation and manner as above excepting omission of the 3-glycidyloxypropyl trimethoxy silane as the component (C). The emulsion II contained 40.8% by weight of non-volatile matter and had a pH of 6.8.

A further silicone-based aqueous emulsion, referred to as the emulsion III hereinbelow, was prepared also for comparative purpose in the following manner. Thus, 7.5 g of N-(2-aminoethyl)-3-aminopropyl methyl dimethoxy silane and 1000 g of a dimethylpolysiloxane having a viscosity of 3000 centistokes at 25° C. and terminated at each molecular chain end with a silicon-bonded hydroxy group were introduced into a four-necked flask of 2 liter capacity equipped with a stirrer, reflux condenser, thermometer and inlet tube of nitrogen gas and the mixture was agitated at 150° C. under an atmosphere of nitrogen gas for 2 hours to give a modified dimethylpolysiloxane terminated at each molecular chain end with a N-(2-aminoethyl)-3-aminopropyl methyl methoxy silyl group. This modified dimethylpolysiloxane had a viscosity of 5500 centistokes at 25° C.

In the next place, 350 g of the thus prepared modified dimethylpolysiloxane were admixed with 40 g of a non-ionic surface active agent of the polyoxyethylene alkyl ether type and 610 g of water and the mixture was emulsified by using a homomixer to give an aqueous emulsion, which is referred to as the emulsion III hereinbelow.

Another aqueous emulsion, referred to as the emulsion IV hereinbelow, was prepared in a similar manner to above from 350 g of a methyl hydrogen polysiloxane having a viscosity of 30 centistokes at 25° C. and terminated at each molecular chain end with a trimethyl silyl group, 40 g of a polyoxyethylene alkyl ether and 610 g of water.

Four treatment baths, referred to as the baths, I, II, III and IV hereinbelow, were prepared in the following formulations.

Bath I: 5 parts of the emulsion I and 95 parts of water
Bath II: 10 parts of the emulsion I and 90 parts of water
Bath III: 10 parts of the emulsion II and 90 parts of water
Bath IV: 9.5 parts of the emulsion III, 0.5 part of the emulsion IV, 0.5 part of the emulsion D and 89.5 parts of water A tropical cloth of wool was soaked with one of the thus prepared baths I to IV and the wet pick-up on the cloth was controlled to 100% by weight by using a mangle roller and dried in a hot-air oven at 100° C. for 3 minutes followed by a heat-treatment at 160° C. for 2 minutes to form a cured coating film on the fiber surface. The weight increase in the woolen cloths finished in the above described manner was 2%, 4%, 4% and 3.5% by weight for the baths I, II, III and IV, respectively.

The woolen cloths finished in the above described manner were each subjected to the laundering test by repeating the procedure specified in JIS L 0217 using a household electric washing machine and the shrinkage in % and the feeling of touch were examined after the first, 5th, 10th and 20th laundering tests to give the results shown in Table 1 below together with the results obtained with the same woolen cloth before the finishing treatment with the silicone-based fabric finishing agent.

The shrinkage in % was determined by drawing two 10 cm apart benchmark lines on the cloth before the first laundering along each direction of the wrap and weft and measuring the distance between the benchmark lines after the respective laundering tests to calculate the percentage of the decreased distance relative to the initial distance, i.e. 10 cm, and the values for the two directions were summed up to give the results shown in Table 1.

The feeling of touch was determined organoleptically by hand-touching of panel members who were requested to give the feeling in four ratings of A, B, C and D according to the following criteria.

A: soft and excellent slipperiness
B: good and acceptable feeling
C: fairly good feeling
D: hard feeling without slipperiness

TABLE 1

| Bath No. | I | II | III | IV | None |
|---|---|---|---|---|---|
| Shrinkage, %, after laundering of | | | | | |
| 1st time | 0 | 0 | 0 | 2.5 | 5.0 |
| 5th time | 0 | −0.1 | 0.5 | 5.0 | 20 |
| 10th time | 0.5 | 0 | 2.0 | 8.2 | 32 |
| 20th time | 1.2 | 0 | 7.5 | 15.5 | 35 |
| Feeling of touch, after laundering of | | | | | |
| 1st time | A | A | A | B | D |
| 5th time | B | A | B–C | D | D |
| 10th time | B | B | D | D | D |
| 20th time | B–C | B | D | D | D |

Further, a woolen knit cloth was treated with the treatment baths I to IV in substantially the same manner as above except that the wet pick-up of the soaked cloth was 120% by weight for each of the baths I to IV corresponding to a weight increase of 2.4%, 4.8%, 2.4% and 4.2% by weight, respectively, after drying. Table 2 below shows the results of the tests for the shrinkage and feeling of touch for each of the baths I to IV together with the results obtained with the same cloth before the finishing treatment with the treatment bath. The testing procedures and the criteria for the evaluation of the results were the same as for Table 1.

TABLE 2

| Bath No. | I | II | III | IV | None |
|---|---|---|---|---|---|
| Shrinkage, %, after laundering of | | | | | |
| 1st time | 0 | 0 | 0 | 5.0 | 30 |
| 5th time | 0 | 0 | 2.5 | 8.5 | *) |
| 10th time | 0.2 | 0 | 5.2 | 25 | — |
| 20th time | 0.7 | 0.2 | 7.0 | 50 | — |
| Feeling of touch, after laundering of | | | | | |
| 1st time | B | B | B | B | B |
| 5th time | B | B | B–C | C | D |
| 10th time | B | B | D | D | D |
| 20th time | B | B | D | D | D |

*) The knit cloth was felted.

What is claimed is:

1. A silicone-based fabric finishing agent which comprises, in the form of a uniform blend:
   (A) an aqueous emulsion of (A-1) 100 parts by weight of an organopolysiloxane having, in a molecule, at least two hydroxy groups directly bonded to the silicon atoms emulsified in (A-2) from 25 to 600 parts by weight of water containing (A-3) from 0.3 to 20 parts by weight of an anionic surface active agent dissolved in the water;
   (B) from 1 to 60 parts by weight of a uniform blend consisting of (B-1) from 0.1 to 10 parts by weight of a reaction product of an amino-functional alkoxy silane compound or a hydrolysis product thereof with an acid anhydride and (B-2) from 1 to 50 parts by weight of a colloidal silica;
   (C) from 0.1 to 10 parts by weight of an epoxy-functional alkoxy silane compound; and
   (D) from 0.01 to 10 parts by weight of a curing catalyst.

2. The silicone-based fabric finishing agent as claimed in claim 1 wherein the organopolysiloxane as the component (A-1) has an average molecular weight of at least 10,000.

3. The silicone-based fabric finishing agent as claimed in claim 1 wherein the anionic surface active agent as the component (A-3) is selected from the group consisting of salts of aliphatic sulfate esters, aliphatic group-substituted benzene sulfonic acids and aliphatic group-substituted naphthalene sulfonic acids, salts of polyethylene glycol sulfate esters and salts of lauryl sulfates.

4. The silicone-based fabric finishing agent as claimed in claim 1 wherein the amino-functional alkoxy silane compound is selected from the group consisting of 3-aminopropyl triethoxy silane, N-(2-aminoethyl)-3-aminopropyl methyl dimethoxy silane, 3-amino-propyl methyl diethoxy silane, N-(2-aminoethyl)-3-aminopropyl trimethoxy silane, N-triethylenediaminepropyl trimethoxy silane and N-triethylenediaminepropyl methyl dimethoxy silane.

5. The silicone-based fabric finishing agent as claimed in claim 1 wherein the acid anhydride is selected from the group consisting of methyl tetrahydrophthalic anhydride, benzophenone tetracarboxylic acid anhydride, phthalic anhydride, maleic anhydride, pyromellitic anhydride, succinic anhydride, polyazelaic polyanhydride, trimellitic anhydride, phenylmaleic acid anhydride, methyl hexahydrophthalic anhydride, dodecyl succinic acid anhydride and dichloromaleic anhydride.

6. The silicone-based fabric finishing agent as claimed in claim 1 wherein the amount of the component (B) is in the range from 2 to 30 parts by weight per 100 parts by weight of the organopolysiloxane as the component (A-1).

7. The silicone-based fabric finishing agent as claimed in claim 1 wherein the epoxy-functional alkoxy silane compound is selected from the group consisting of 3-glycidyloxypropyl trimethoxy silane, 3-glycidyloxypropyl methyl dimethoxy silane, 3-glycidyloxypropyl triethoxy silane, 3-glycidyloxypropyl methyl diethoxy silane, 2-(3,4-epoxycyclohexyl)ethyl trimethoxy silane, 2-(3,4-epoxycyclohexyl)ethyl methyl dimethoxy silane and 2-(3,4-epoxycyclohexyl)ethyl triethoxy silane.

8. The silicone-based fabric finishing agent as claimed in claim 1 wherein the amount of the epoxy-functional alkoxy silane compound is in the range from 0.5 to 5 parts by weight per 100 parts by weight of the organopolysiloxane as the component (A-1).

9. The silicone-based fabric finishing agent as claimed in claim 1 wherein the curing catalyst is selected from the group consisting of metal salts of an organic acid, titanate esters and amine compounds.

10. The silicone-based fabric finishing agent as claimed in claim 1 wherein the amount of the curing catalyst is in the range from 0.1 to 3 parts by weight per 100 parts by weight of the organopolysiloxane as the component (A-1).

11. A fabric material finished with the fabric finishing agent according to claim 1.

12. The silicone-based fabric finishing agent as claimed in claim 1, wherein the amino-functional alkoxy silane compound is selected from the group consisting of 3-aminopropyl triethoxy silane, N-(2-aminoethyl)-3-aminopropyl methyl dimethoxy silane, 3-amino-propyl methyl diethoxy silane, N-(2-aminoethyl)-3-aminopropyl trimethoxy silane, N-triethylenediaminepropyl trimethoxy silane, and N-triethylenediaminepropyl methyl dimethoxy silane; wherein the acid anhydride is selected from the group consisting of methyl tetrahydrophthalic anhydride, benzophenone tetracarboxylic acid anhydride, phthalic anhydride, maleic anhydride, pyromellitic anhydride, succinic anhydride, polyazelaic polyanhydride, trimellitic anhydride, phenylmaleic acid anhydride, methyl hexahydrophthalic anhydride, dodecyl succinic acid anhydride, and dichloromaleic anhydride; and wherein the epoxy-functional alkoxy silane compound is selected from the group consisting of 3-glycidyloxypropyl trimethoxy silane, 3-glycidyloxypropyl methyl dimethoxy silane, 3-glycidyloxy-propyl triethoxy silane, 3-glycidyloxypropyl methyl diethoxy silane, 2-(3,4-epoxycyclohexyl)ethyl trimethoxy silane, 2-(3,4-epoxycyclohexyl)ethyl methyl dimethoxy silane, and 2-(3,4-epoxycyclohexyl)ethyl triethoxy silane.

13. The silicone-based finishing agent as claimed in claim 12, wherein the amount of the component (B) is in the range from 2 to 30 parts by weight per 100 parts by weight of the organopolysiloxane as the component (A-1), wherein the amount of the epoxy-functional alkoxy silane compound is in the range from 0.5 to 5 parts by weight per 100 parts by weight of the organopolysiloxane as the component (A-1), and wherein the amount of the curing catalyst is in the range from 0.1 to 3 parts by weight per 100 parts by weight of the organopolysiloxane as the component (A-1).

14. A keratinous fabric according to claim 11.

15. A woolen fabric according to claim 11.

16. A finishing method of treating a fabric material which comprises the steps of depositing on the fabric from 0.5 to 10% by weight calculated on a solids and dry fabric material basis of a silicone-based fabric finishing agent as claimed in claim 1, and then drying and heat-treating the thus treated fabric.

17. A method according to claim 16, wherein the fabric is keratinous.

18. A method according to claim 16, wherein the fabric is woolen.

* * * * *